(12) United States Patent
Yoshida

(10) Patent No.: US 7,892,468 B2
(45) Date of Patent: Feb. 22, 2011

(54) POLYTETRAFLUOROETHYLENE SLIT YARN AND METHOD FOR MANUFACTURING SAME

(75) Inventor: Kazumasa Yoshida, Tokyo (JP)

(73) Assignee: Japan Gore-Tex Inc., Tokyo (JP)

( * ) Notice: Subject to any disclaimer, the term of this patent is extended or adjusted under 35 U.S.C. 154(b) by 0 days.

(21) Appl. No.: 12/620,681

(22) Filed: Nov. 18, 2009

(65) Prior Publication Data

US 2010/0102480 A1    Apr. 29, 2010

Related U.S. Application Data

(62) Division of application No. 11/491,663, filed on Jul. 21, 2006, now abandoned.

(30) Foreign Application Priority Data

Jul. 29, 2005  (JP) ............... 2005-221604

(51) Int. Cl.
B29C 53/48    (2006.01)
(52) U.S. Cl. .................... 264/146; 264/285
(58) Field of Classification Search ........... 264/146, 264/285
See application file for complete search history.

(56) References Cited

U.S. PATENT DOCUMENTS

| | | | | |
|---|---|---|---|---|
| 2,471,490 | A * | 5/1949 | Mercer | 72/178 |
| 3,393,547 | A * | 7/1968 | Kortan | 72/131 |
| 3,503,106 | A | 3/1970 | Port et al. | |
| 3,628,361 | A * | 12/1971 | De Rupa | 72/181 |
| 4,614,632 | A * | 9/1986 | Kezuka et al. | 264/280 |
| 4,950,511 | A | 8/1990 | Francis | |
| 5,061,561 | A | 10/1991 | Katayama | |
| 5,202,064 | A | 4/1993 | Furusawa et al. | |
| 5,470,655 | A | 11/1995 | Hirai | |
| 5,518,314 | A | 5/1996 | Kawafuchi et al. | |

(Continued)

FOREIGN PATENT DOCUMENTS

DE        197 34 049 C1    12/1998

(Continued)

OTHER PUBLICATIONS

Mason, Robert L.; Gunst, Richard F.; Hess, James L.; Statistical Design and Analysis of Experiments- With Applications to Engineering and Science ($2^{nd}$ Edition), (pp. 33-63). John Wiley & Sons, 2003. Online version available at: http://www.knovel.com/knovel2/Toc.jsp?BookID=1406&VerticalID=0/.

(Continued)

Primary Examiner—Joseph S Del Sole
Assistant Examiner—Kimberly A Stewart
(74) Attorney, Agent, or Firm—Allan M. Wheatcraft

(57) ABSTRACT

A slit yarn wherein both side parts of the slit yarn are folded one or more times, and the folded width is substantially uniform along the direction of length of the yarn. In this slit yarn, when the width is measured at 20 or more points at intervals of 0.5 m, and the fluctuation coefficient X shown in the following Equation (1) is calculated on the basis of the average value W(avg) and the standard deviation W(σ), this X is (for example) approximately 4% or less. Furthermore, in the slit yarn of the present invention, the abovementioned folded parts are ordinarily shape-set.

$$X(\%) = W(\sigma)/W(\text{avg}) \times 100 \qquad (1)$$

7 Claims, 13 Drawing Sheets

U.S. PATENT DOCUMENTS

| | | |
|---|---|---|
| 6,696,152 B1 | 2/2004 | Lin |
| 6,790,225 B1 * | 9/2004 | Shannon et al. ............ 623/1.13 |
| 6,949,287 B2 | 9/2005 | Huang et al. |
| 2002/0174941 A1 | 11/2002 | Garegnani |
| 2004/0009429 A1 | 1/2004 | Sato |
| 2004/0099527 A1 | 5/2004 | Nakayama |
| 2006/0048497 A1 | 3/2006 | Bloch |

FOREIGN PATENT DOCUMENTS

| | | |
|---|---|---|
| EP | 0 307 785 A | 3/1989 |
| GB | 2317828 | 4/1998 |
| JP | S36-022915 | 11/1961 |
| JP | S48-008769 | 3/1973 |
| JP | 51-089561 * | 2/1975 |
| JP | S54-001067 A | 2/1979 |
| JP | H02-187450 A | 7/1990 |
| JP | 07-258933 | 10/1995 |
| JP | 63-126911 | 5/1998 |
| WO | WO95/34699 | 12/1995 |

OTHER PUBLICATIONS

Kaldolph, Sara J.; Langford, Anna. Textiles 7th edition, (pp. 143-171) Merrill, 1998.

* cited by examiner

POLYTETRAFLUOROETHYLENE SLIT YARN AND METHOD FOR MANUFACTURING SAME

RELATED APPLICATION

The present application is a divisional application of U.S. patent application Ser. No. 11/491,663 filed Jul. 21, 2006 now abandoned.

FIELD OF THE INVENTION

The present invention relates to a polytetrafluoroethylene yarn and a method for manufacturing the same.

BACKGROUND OF THE INVENTION

Polytetrafluoroethylene (PTFE) yarns are superior in terms of heat resistance, weather resistance, chemical resistance, low friction coefficient, low dielectric constant, and biocompatibility (anti-thrombic properties). Accordingly, these yarns have been used in a broad range of fields. For example, such yarns have been used as supports in various types of membranes such as reverse osmosis membranes, ultra-filtration membranes, precision filtration membranes, filtration membranes for bag filters, power filter filtration membranes, and ion exchange membranes. There are also cases in which such yarns are used in surgical sutures and surgical application cloths.

Since melt molding is difficult in the case of (PTFE), such yarns are ordinarily manufactured by emulsion spinning methods and slit yarn methods. Among these methods, slit yarn methods are preferred in that there are few impurities, and such yarns are especially ideal for use as supports in ion exchange membranes.

In slit yarn methods, yarns are manufactured substantially as follows: specifically, a PTFE powder is first mixed with a lubricant to form a paste. This is extrusion-molded and dried by heating so that the lubricant is removed. The extrusion-molded product thus obtained is drawn at a temperature below the melting point of the PTFE to form a sheet. Then, this sheet is slit in a long slender configuration to form a tape. A slit yarn is then manufactured by drawing this tape at a temperature equal to or greater than the melting point of the PTFE.

However, the abovementioned slit body of the sheet (tape) is extremely flexible, so that the tape may be bent in the longitudinal direction while running through the apparatus. Furthermore, the bent width in the direction of length of the tape is non-uniform, so that there is a large variation in the diameter of the yarn.

Furthermore, if the tape is made thinner, the abovementioned bending can be reduced; however, the softness of the slit yarn obtained drops, and the slitting workability also drops.

Furthermore, in the slit surface of the slit body (tape), the micro-fibers (fibril portions forming the porous structure) are cut so that nap tends to be formed, thus generating fiber debris, and forming sites for yarn breakage.

SUMMARY OF THE INVENTION

The present invention was devised in light of the above facts; it is an object of the present invention to provide slit yarn that can suppress variation in the denier, and a method for manufacturing the same.

It is another object of the present invention to provide a slit yarn that can reduce fiber debris and reduce yarn breakage, and a method for manufacturing the same.

As a result of diligent research for the purpose of solving the abovementioned problems, the present inventor discovered that if a strip-form protruding part is formed on a rotating roll, an expanded porous polytetrafluoroethylene (ePTFE) tape is caused to run along the top surface of this strip-form protruding part, and the tape is bent at both side parts of the top surface of the protruding part, the folded width of the slit yarn that is obtained can be made substantially uniform in the direction of length of the yarn, and that in a slit yarn with a substantially uniform folded width obtained in this manner, variation in the yarn diameter can be suppressed, and fiber debris and yarn breakage can also be reduced. This discovery led to the perfection of the present invention.

Specifically, the main point of the slit yarn of the present invention is that both side parts are folded one or more times, and the folded width is substantially uniform in the direction of length of the yarn. In this slit yarn, when the width is measured at 20 or more points located at intervals of 0.5 m, and the fluctuation coefficient X shown in the following equation (1) is calculated on the basis of the average value W(avg) and standard deviation W(σ), this X is (for example) approximately 4% or less. Furthermore, in the slit yarn of the present invention, the abovementioned folded parts are ordinarily shape-set.

$$X(\%) = W(\sigma)/W(\text{avg}) \times 100 \tag{1}$$

It is desirable that the abovementioned slit yarn be formed into a twisted yarn by applying a twist. The number of twists may be 800 T/m or less, preferably 500 T/m or less. This twisted yarn can be formed into a cloth, and this cloth can be used as (for example) a support for an ion exchange membrane.

The slit yarn of the present invention can be manufactured by (a) slitting an expanded porous polytetrafluoroethylene sheet in the direction of length to form a tape, (b) causing the abovementioned tape to run over a first rotating roll on which a strip-form protruding part having a top surface with a width narrower than the tape width is formed so as to cover this top surface, and bending the tape at both side parts of the top surface of the protruding part, and (c) drawing the tape after folding the bent parts. It is desirable that a tensile tension be applied to the tape when the tape is caused to run along the abovementioned strip-form protruding part. The curvature radius R of the corner parts formed by the top surface and side surfaces of the abovementioned strip-form protruding part is (for example) approximately 1.0 mm or less. It is desirable that both side parts of the tape be bent to an acute angle; accordingly, for example, (i) the angle formed by the top surface and side surfaces of the abovementioned strip-form protruding part may be set at less than 90°, or (ii) following the bending of the tape, the bent part of the tape alone may be caused to advance in an interval that becomes narrower moving in the direction of progression of the tape. In order to fold the bent part, for example, (i) the tape may be caused to run over a second rotating roll while the system is arranged so that the bent sides form the surface, after both sides of the tape have been bent to an acute angle, or (ii) the tape may be pressed in the direction of thickness so that both side parts of the tape are folded, after both sides of the tape have been bent into acute angles.

In the slit yarn of the present invention, since the folded width is substantially uniform, variation in the yarn diameter is suppressed, and fiber debris and yarn breakage can also be reduced. Furthermore, in the method of the present invention for manufacturing a slit yarn, a strip-form protruding part is formed on a rotating roll, an ePTFE tape is caused to run along the top surface of this strip-form protruding part, and this tape is bent at both side parts of the top surface of this strip-form protruding part; accordingly, the folded width of the slit yarn that is obtained can be made substantially uniform in the direction of length of the yarn.

DETAILED DESCRIPTION OF THE INVENTION

The present invention will be described in greater detail below with reference to the attached figures.

Figure 1:
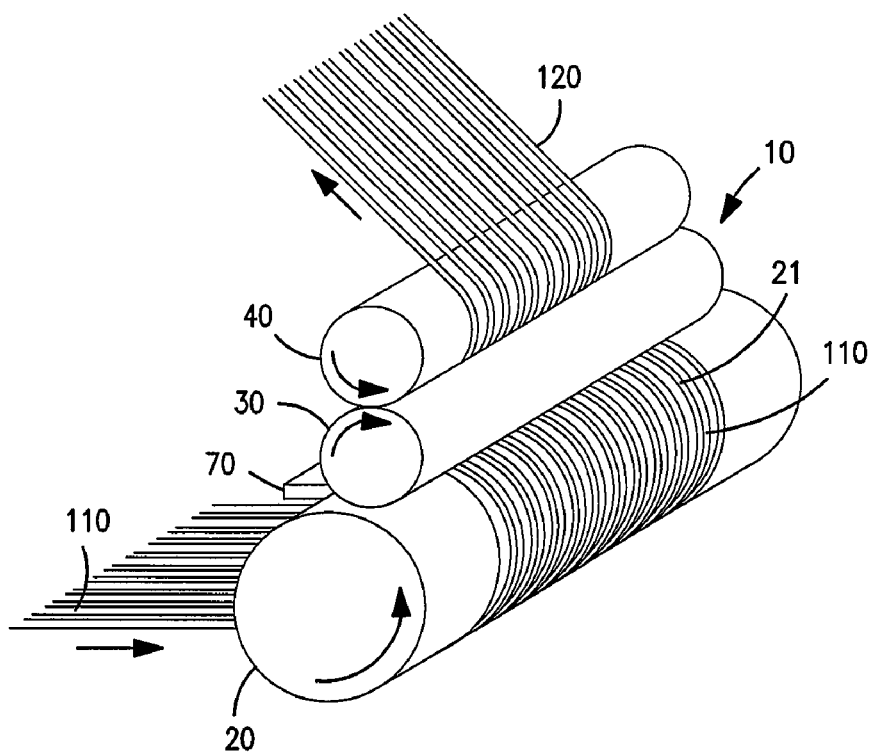
FIG. 1 is a schematic perspective view of the apparatus used to illustrate one example of the manufacturing method of the present invention.

FIG. 1 is a schematic perspective view of the apparatus used to illustrate one example of the method of the present invention for manufacturing a slit yarn. In this manufacturing method illustrated in the figures, a three-roll device 10 which conveys an expanded porous polytetrafluoroethylene (ePTFE) from the bottom to the top (in order from the bottom side, these three rolls are called the bending roll, folding roll and nip roll; furthermore, the bending roll may be referred to as the first rotating roll in some cases, and the folding roll may be referred to as the second rotating roll in some cases) is used. To describe this in greater detail, on the bending roll 20 on the bottom side, an ePTFE tape 110 obtained by slitting an ePTFE sheet at a specified width by means of a slitting blade (not shown in the figures) is taken up. A plurality of strip-form protruding parts is formed on this bending roll 20 along the running direction of the ePTFE tape 110. As a result of the ePTFE tape 110 being wrapped on these strip-form protruding parts 21, both side parts of the tape 110 are bent. Furthermore, after the angle of the abovementioned bend is adjusted to an acute angle by a guide member 70 disposed between the bending roll 20 and folding roll 30, the tape is caused to run over the folding roll 30 while the system is arranged so that the bent sides form the surface, thus folding both side parts of the tape 110. Next, the folded parts are pressed (nipped) in the thickness direction of the tape by the folding roll 30 and nip roll 40, and the folded tape 120 that has thus been nipped is drawn (especially hot-drawn) by a drawing machine (not shown in the figures) so that a slit yarn is manufactured.

Figure 2:
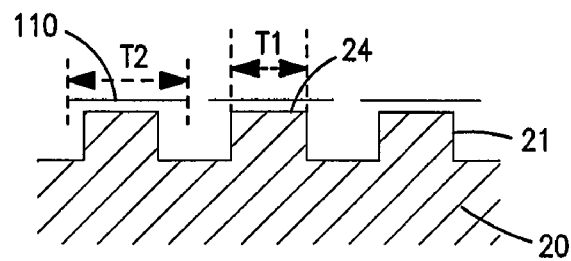
FIG. 2 is a sectional view used to illustrate the bending system in the bending roll 20 shown in FIG. 1.

In the manufacturing method of this example shown in the figures, as is shown in the schematic sectional view of FIG. 2, the width T1 of the top surface 24 of each strip-form protruding part 21 formed on the bending roll 20 is narrower than the width T2 of the ePTFE tape 110 is caused to run so that this narrow top surface 24 is covered. Accordingly, as is shown in the schematic sectional view in FIG. 3, the ePTFE tape 110 can be bent into substantially a C-form shape by both side parts (edges) 23, 23 of the top surface 24 of the strip-form protruding part. Especially in the example shown in the figures, since a tensile tension is applied to the ePTFE tape 110, the ePTFE tape 110 can be more securely bent by both side parts 23, 23 of the top surface of the protruding part.

Furthermore, as long as bending of the ePTFE tape is substantially possible, there are no particular restrictions on the width T2 of the ePTFE tape 110. For example, this width is 0.5 mm or greater, preferably 1 mm or greater, and even more preferably 2 mm or greater. Furthermore, the upper limit on the width T2 is approximately 50 mm; e.g., the width T2 is ordinarily about 10 mm. There are no particular restrictions on the thickness of the ePTFE tape 110 as long as bending of the ePTFE tape is substantially possible following slitting. For example, this thickness is approximately 5 μm or greater (especially 10 μm or greater) but 1000 μm or less (especially 700 μm or less). If the thickness of the ePTFE tape 110 departs from the abovementioned range, folding of the ePTFE tape becomes substantially difficult.

Figure 4:
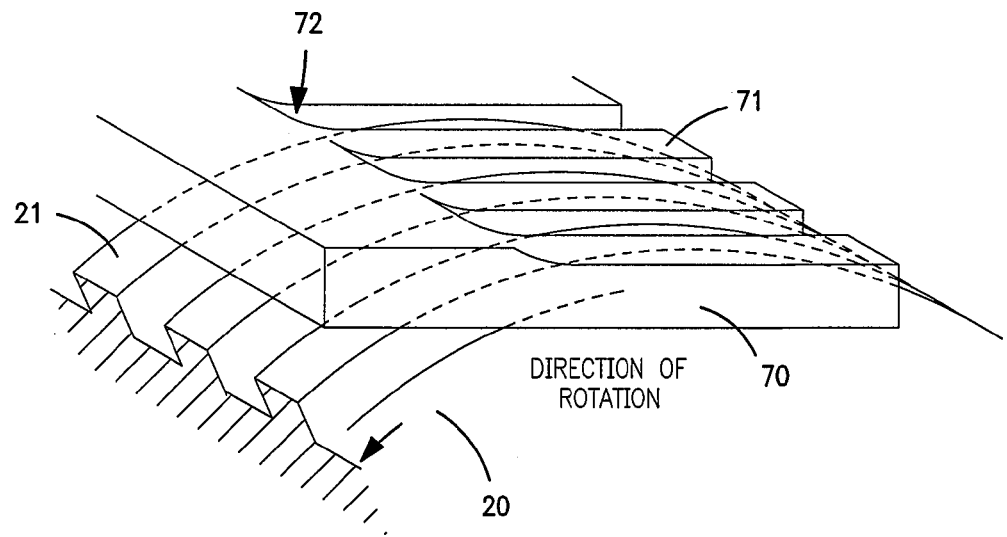
FIG. 4 is a schematic perspective view showing the guide member 70 used in the device shown in FIG. 1.
Figure 5:
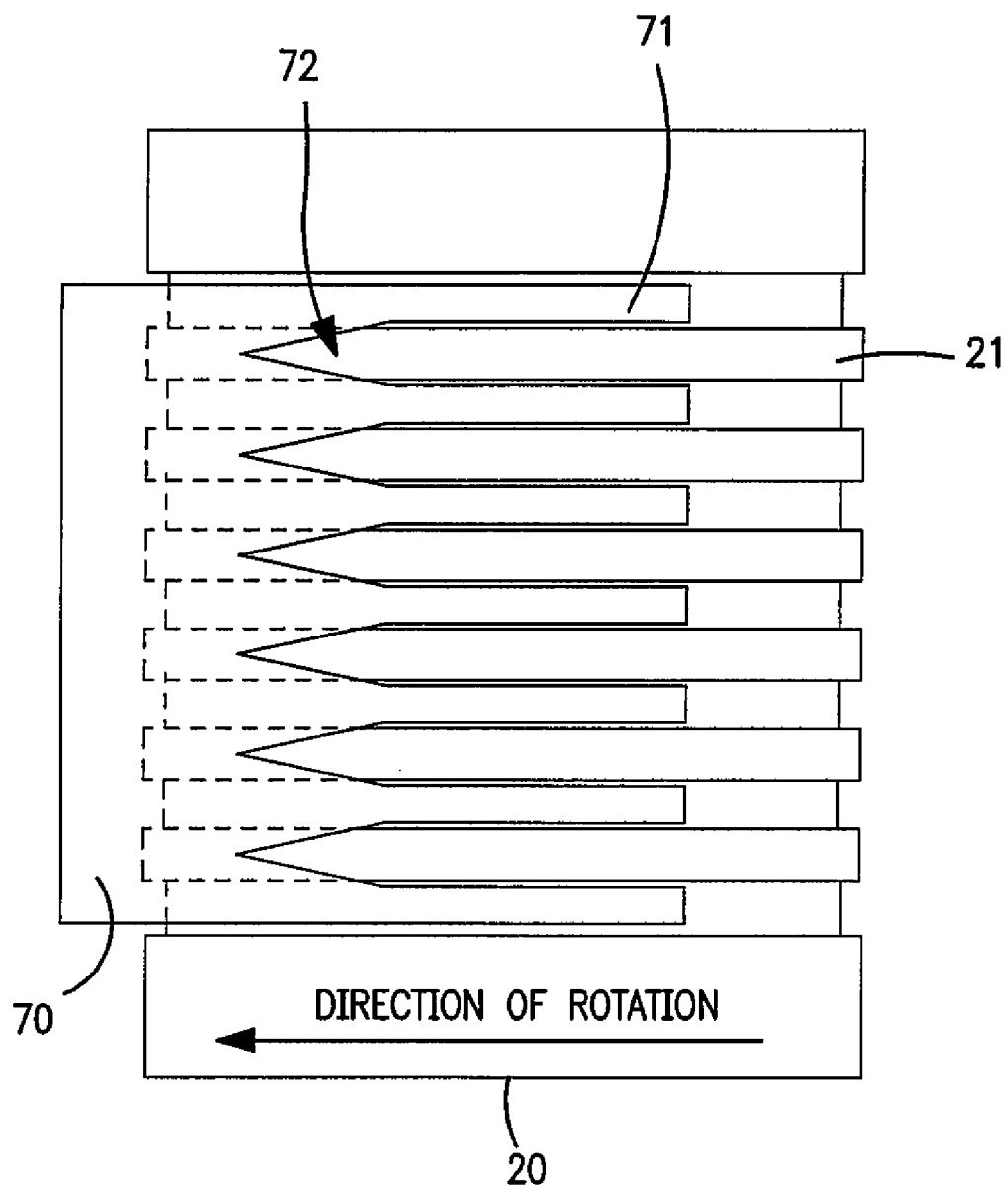
FIG. 5 is a schematic plan view showing the guide member 70 used in the device shown in FIG. 1.

In the example shown in the abovementioned figures, a guide member 70 is used in order to adjust the bent parts of the ePTFE tape 110 to an acute angle. Details of this guide member 70 are shown in the schematic perspective view shown in FIG. 4 and the schematic plan view shown in FIGS. 4 and 5. As is shown in FIGS. 4 and 5, the guide member 70 comprises a plurality of comb-tooth-form protruding parts 71, and the system is devised so that these comb-tooth-form protruding parts 71 are mutually interlocked with the strip-form protruding parts 21 formed on the bending roll 20. Furthermore, the comb-tooth-form protruding parts 71 show narrower mutual gaps as these parts proceed in the forward direction of rotation of the bending roll 20, and form V-shaped parts (gaps) 72 that appear to have substantially the shape of a letter V when viewed from above. Furthermore, when these V-shaped parts (gaps) 72 are viewed from the side, these parts return upward toward the folding roll (third roll) 30.

Figure 6:
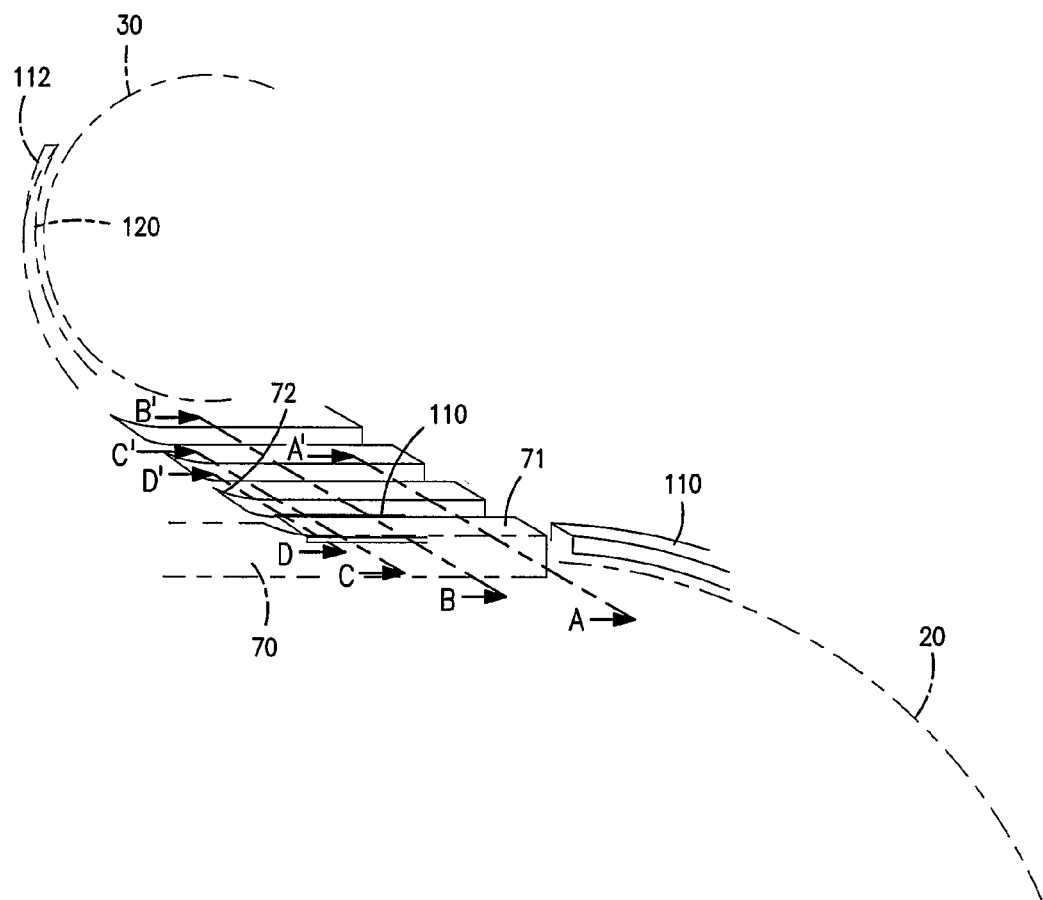
FIG. 6 is a schematic diagram used to illustrate the bending effected by the guide member 70.
Figure 7A:
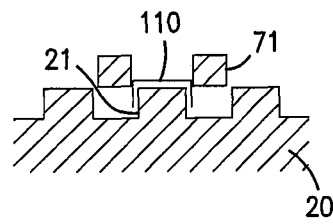
FIG. 7 is a sectional view used to illustrate the bending effected by the guide member 70.
Figure 7B:
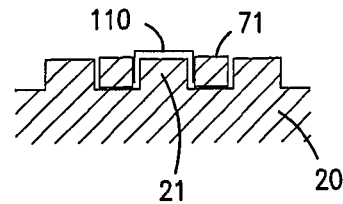
Figure 7C:
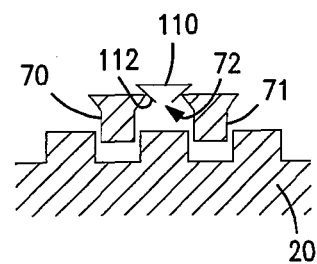
Figure 7D:
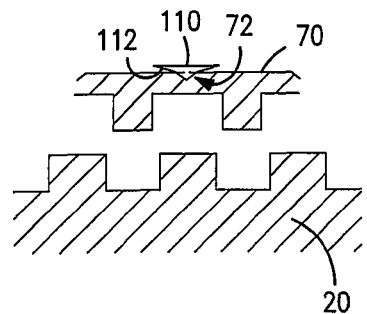

The function of this guide member 70 will be described with reference to FIGS. 6, 7(a), 7(b), 7(c), and 7(d). The sectional view along line A-A' in FIG. 6 corresponds to FIG. 7(a), the sectional view along line B-B' in FIG. 6 corresponds to FIG. 7(b), the sectional view along line C-C' in FIG. 6 corresponds to FIG. 7(c), and the sectional view along line D-D' in FIG. 6 corresponds to FIG. 7(d). As is shown in FIGS. 6 and 7(a), the ePTFE tape 110 that has been bent into a sectional C shape by the bending roll 20 (strip-form protruding parts 21) is fed upward by the rotation of the bending roll 20, and is introduced between the comb-tooth-form protruding parts 71. Once the ePTFE tape 110 has been clamped between the comb-tooth-form protruding parts 71 and securely bend (see FIG. 7(b)), the tape 110 leaves the bending roll 20 and advances toward the folding roll 30 (upwards) (see FIG. 6). Furthermore, the V-shaped parts (gaps) 72 of the guide member 70 are also caused to return upward so as to run along the direction of advance of this ePTFE 110, and only the bent parts 112 of the tape 110 are caused to advance into these V-shaped parts 72, so that bending angle can be adjusted to an acute angle (see FIGS. 7(c) and 7(d)).

Furthermore, in the abovementioned method shown in the figures, the ePTFE tape 110 that is bent to an acute angle in the V-shaped parts 72 (guide member 70) is wrapped around the folding roll 30 while the system is devised so that these bent sides form the surface (see FIG. 6). As a result of this wrapping, the bent parts 112 are folded.

Furthermore, in the manufacturing method shown for example in the figures, the folded tape 120 is pressed in the thickness direction of the tape 120 by the nip roll 40, so that the abovementioned folding is made more secure. Furthermore, the tape 120 that is thus securely folded is drawn by a drawing machine (not shown in the figures) so that a slit yarn is manufactured.

Figure 8:
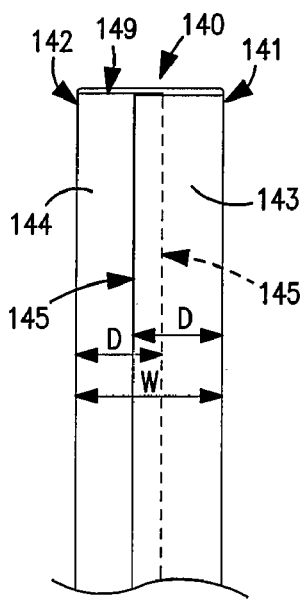
FIG. 8 is a schematic plan view showing one example of the slit yarn of the present invention.

The slit yarn obtained by the abovementioned manufacturing method has substantially the plan view shape shown in FIG. 8. Specifically, both side parts 141 and 142 of the slit yarn 140 are folded, and the folded width D is substantially uniform in the direction of length of the yarn. In more concrete terms, the uniformity of this folded width D can be expressed by a fluctuation coefficient X that is associated with the width W of the slit yarn. The fluctuation coefficient X is a value that is calculated on the basis of the following equation (1) from the average value W(avg) and standard deviation W(σ) of the width W of the slit yarn; the measurement points of the width W of the slit yarn are set as 20 or more points at intervals of 0.5 m.

$$X(\%) = W(\sigma)/W(avg) \times 100 \quad (1)$$

In the slit yarn of the present invention, for example, the abovementioned fluctuation coefficient X is 4% or less, preferably 3.5% or less, and even more preferably 3% or less. Since the folded width D of the slit yarn of the present invention is thus substantially uniform in the direction of length of the yarn, variation in the yarn diameter of the yarn can be suppressed. Furthermore, drawing irregularity can be reduced, and the uniformity of the physical properties in the direction of length of the slit yarn can also be improved.

Furthermore, as long as a strength which is such that there is no yarn breakage can be ensured, there are no particular restrictions on the width W(avg) of the slit yarn. For example, this width is 10 μm, preferably 50 μm, and even more preferably 50 μm. There are no particular restrictions on the upper limit of the width W(avg) of the slit yarn; however, this width is usually about 5000 μm or less (e.g., 1000 μm or less, and especially 500 μm or less). Furthermore, there are no particular restrictions on the denier of the slit yarn, as long as a strength that is sufficient to prevent yarn breakage during twisting can be maintained. For example, this denier is 5 denier or greater, preferably 10 denier or greater, and even more preferably 20 denier or greater. There are no particular restrictions on the upper limit of the denier of the slit yarn; this denier is usually about 2000 denier or less (e.g., 1000 denier or less, especially 500 denier or less).

Furthermore, in the slit yarn of the present invention, as is shown in the abovementioned FIG. 8, a slit sectional surface 145 that has a low durability against wear is securely folded to the inside. Accordingly, napping of the yarn can also be suppressed, and yarn breakage or a drop in the strength of the yarn can also be suppressed. Furthermore, the generation of fiber debris can also be prevented.

Figure 9:
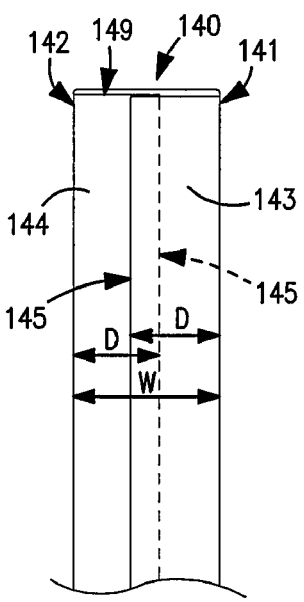
FIG. 9 is a schematic plan view showing another example of the slit yarn of the present invention.

The folded parts 143 and 144 of the slit yarn need not overlap as shown in FIG. 8; these parts may instead overlap as shown in FIG. 9. If the folded parts are overlapped, the slit sectional surface 145 can be covered to a higher degree, and the formation of a finer slit yarn can also easily be accomplished.

Figure 10:
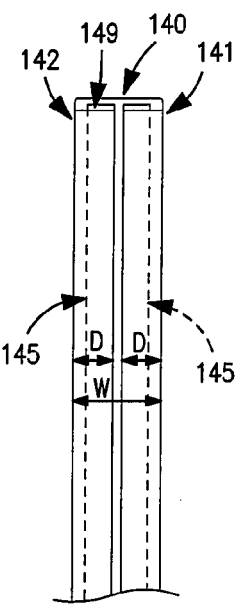
FIG. 10 is a schematic plan view of still another example of the slit yarn of the present invention.
Figure 11:
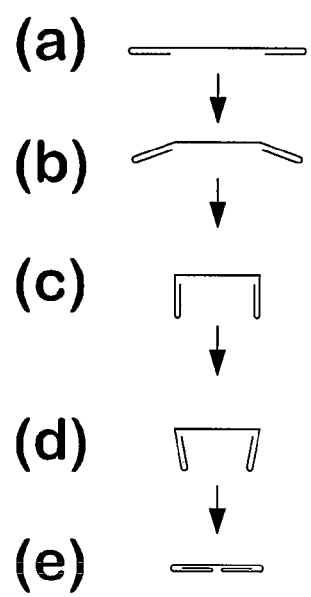
FIG. 11 is a schematic diagram showing one example of a method for manufacturing the slit yarn shown in FIG. 10.

Furthermore, the number of times that both side parts 141 and 142 of the slit yarn 140 are folded is not limited to a single time as shown in FIGS. 8 and 9; this folding may be performed twice as shown in FIG. 10, or three or more times. If both side parts 141 and 142 are folded two or more times, the slit sectional surface 145 can be covered to an even higher degree. Furthermore, the slit yarn 140 shown in FIG. 10 can be manufactured by again bending (see FIGS. 11(b) and 11(c)) and folding (see FIGS. 11(d) and 11(e)) into a C shape the folded tape 120 (or slit yarn 140) in which both side parts have been folded once as shown in FIG. 11(a). Furthermore, as will be described later, this can also be manufactured by using a specified guide member.

Furthermore, in the abovementioned FIGS. 8 through 11, the folded parts 143 and 144 are shown as though a gap 149 remains inside the folded-back structure; however, this is done in order to facilitate understanding of the folded structure of the slit yarn. In actuality, the folded parts 143 and 144 adhere tightly to the non-folded parts (especially by hot molten bonding), and the abovementioned gap 149 does not exist.

Figure 12:
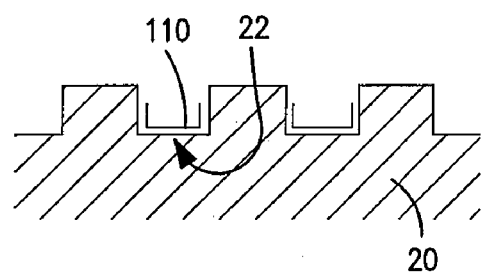
FIG. 12 is a schematic sectional view used to illustrate an alteration of the manufacturing method of the present invention.
Figure 13:
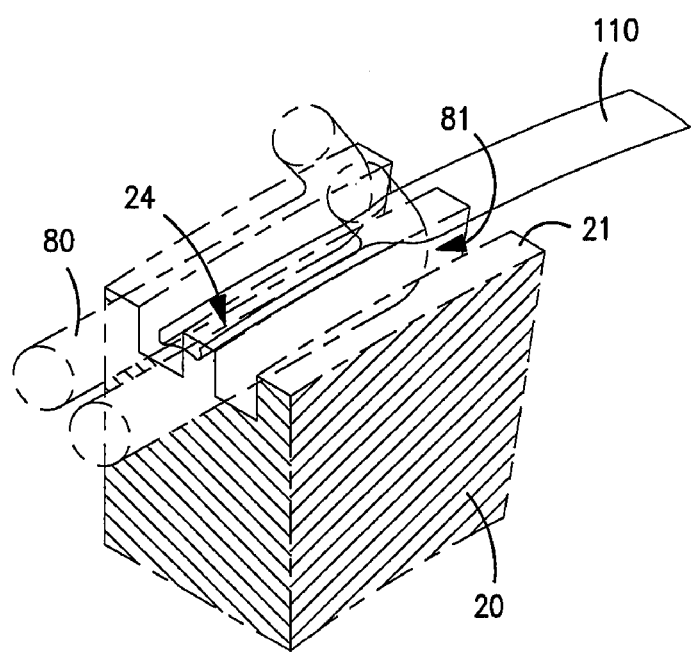
FIG. 13 is a schematic perspective view used to illustrate another alteration of the manufacturing method of the present invention.

The abovementioned slit yarn 140 of the present invention is not limited to the abovementioned manufacturing method illustrated in the figures; this slit yarn can be manufactured by various types of methods. For example, in regard to the bending roll 20, bending into a protruding shape is not absolutely necessary. FIG. 12 is a schematic sectional view of a bending roll 20 in which strip-form recessed parts 22 are formed. If strip-form recessed parts are used as shown in this FIG. 12, the ePTFE tape 110 can be bent into a concave shape. Furthermore, the ePTFE tape 110 can also be bent into a concave shape by utilizing an auxiliary member (round bar or the like) 80 such as that shown in FIG. 13. In the example shown in FIG. 13, an auxiliary member (round bar) 80 is interposed between the strip-form protruding parts 21, and the system is arranged so that a substantially concave shape is formed by this round bar 80 and the top surfaces of the strip-form protruding parts 21. Furthermore, the tip end 81 of the abovementioned auxiliary member (round bar) 80 is bent into substantially a V shape, and the disposition position of this V-shaped tip end part 81 is set in a location where the ePTFE tape 110 is still maintaining a substantially flat shape prior to being bent into a substantially C-shaped configuration. If such an auxiliary member 80 is used, the ePTFE tape 110 can be bent into a concave shape using the V-shaped tip end part

81. Furthermore, there are no particular restrictions on the cross-sectional shape of the auxiliary member 80, as long as this shape is capable of forming a substantially recessed shape together with the top surfaces 24 of the strip-form protruding parts. Various shapes other than a rounded shape may also be used. Furthermore, various shapes may also be used as the shape of the tip end part 81, as long as the ePTFE tape 110 can be guided from a flat shape to a concave shape.

A desirable bending method is a method in which bending into a protruding shape is accomplished using strip-form protruding parts. This method makes it possible to achieve an extremely high degree of uniformity in the folded width D.

Figure 14:
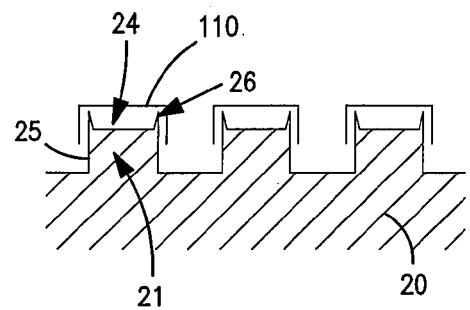
FIG. 14 is a schematic sectional view used to illustrate still another alteration of the manufacturing method of the present invention.

Parts with various cross-sectional shapes can also be used as the abovementioned strip-form protruding parts in cases where such strip-form protruding parts are formed. For example, the top surfaces 24 of the strip-form protruding parts may be formed as flat parts or as parts that are not flat. FIG. 14 is a schematic sectional view showing an example of strip-form protruding parts in which the top surfaces are not flat. In the example shown in FIG. 14, projections 26 are formed between the top surfaces 24 and side surfaces 25 of the strip-form protruding parts 21. A bent habit can be forcibly applied to the ePTFE tape 110 by means of these projections 26.

Figure 3:
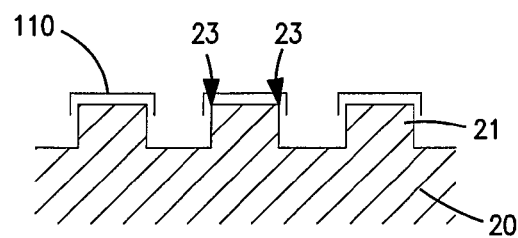
FIG. 3 is a sectional view showing a continuation of FIG. 2.
Figure 15:
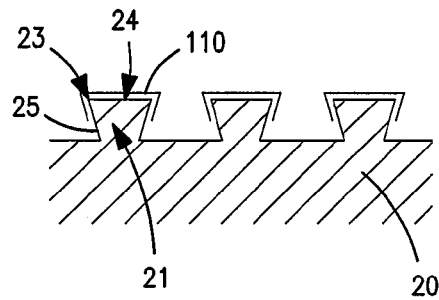
FIG. 15 is a schematic sectional view used to illustrate another alteration of the manufacturing method of the present invention.

Meanwhile, for example, besides the strip-form protruding parts shown in the abovementioned FIG. 3, the strip-form protruding parts shown in FIG. 5 can also be used as strip-form protruding parts in which the top surface is flat. In the example shown in FIG. 15, the corner parts (corners, edges) 23 between the top surfaces 24 and side surfaces 25 of the strip-form protruding parts 21 form an angle of less than 90° (e.g., approximately 50 to 89°). Accordingly, both side parts of the ePTFE tape 110 can be bent to an acute angle.

Furthermore, in cases where the top surfaces 24 of the strip-form protruding parts are flat, for example, the curvature radius R of the corner parts 23 is approximately 1.0 mm or less, preferably 0.3 mm or less, and even more preferably 0.1 mm or less. As the curvature radius R is reduced, the bending habit of the ePTFE tape 110 can be strengthened.

It is desirable that the height of the strip-form protruding parts be greater than the width of the bent parts 112 of the ePTFE tape 110. If this height is greater than the width of the bent parts 112, bending into a substantial C shape can be accomplished in a stable manner.

When the ePTFE tape 110 is bent (especially bent into a protruding shape) by the bending roll 20, it is desirable to apply a tensile tension to the ePTFE tape since the bending habit can be strongly fixed in this case. However, it is not absolutely necessary to apply a tensile tension.

There are no particular restrictions on the material of the bending roll 20; however, a comparatively hard member (e.g., a metal member of SUS or the like, or a hard plastic member of hard PVC or the like) is desirable. If the bending roll 20 is manufactured using a hard member, the bending habit of the ePTFE tape 110 compared to cases in which a member having a large elasticity such as a rubber-like member or the like is used.

Figure 16:
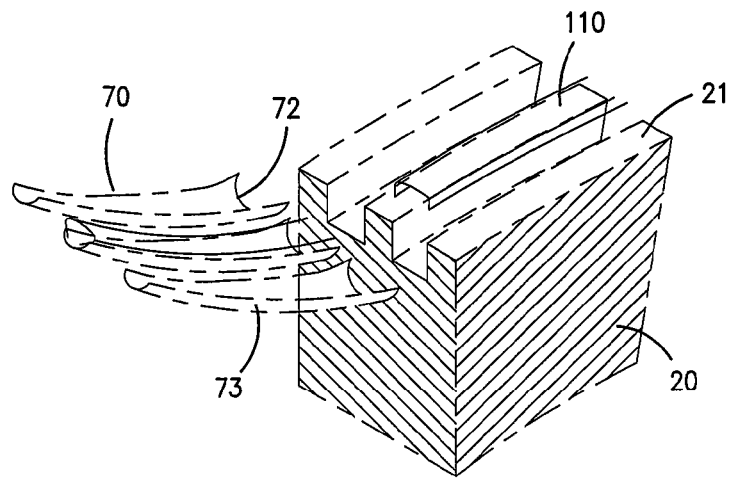
FIG. 16 is a schematic perspective view used to illustrate still another alteration of the manufacturing method of the present invention.

The guide member 70 that is used after the ePTFE tape 110 has been bent by the bending roll 20 may have any of various shapes, as long as this guide member has a gap 72 that allows only the bent parts 112 of the ePTFE tape 110 to advance, and that grows narrower in the direction of advance of the tape 110. The reason for this is that if such a gap 72 is present, the ePTFE tape can be bent to an acute angle. For example, as is shown in FIG. 16, a U-shaped tube 73 whose radius becomes smaller in the direction of advance of the tape 110 can also be used as the guide member 70.

Figure 17:
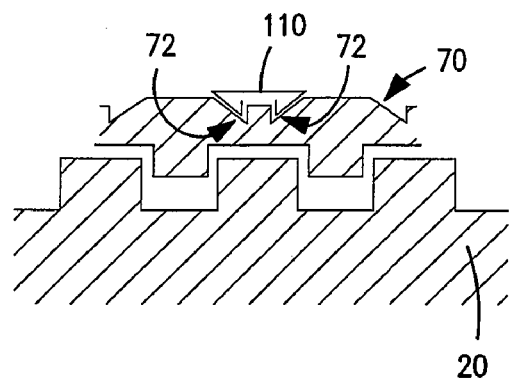
FIG. 17 is a schematic sectional view used to illustrate another alteration of the manufacturing method of the present invention.

The number of gradually narrowing gaps 72 may be a single gap per strip of ePTFE tape, or may be two gaps per strip of ePTFE tape. If there are two gaps 72 per strip of tape, then, as is shown in FIG. 17, the both side parts of the ePTFE tape can be bent twice, and a slit yarn such as that shown in FIG. 10 can be manufactured in one pass.

Furthermore, it is desirable that the guide member 70 have a part that is clamped between the strip-form protruding parts 21 as shown in the comb-tooth-form protruding part 71 or the like. If such a part is present, the bent width of the ePTFE tape 110 can be stabilized to a higher degree.

There are no particular restrictions on the material of the guide member 70; however, since a relatively high dimensional stability is required, a metal member is desirable, and from the standpoint of easy cutting, aluminum is especially desirable.

Furthermore, in the present invention, the guide member 70 is not essential. For example, as was described above, if the corner parts (corners, angles) 23 of the strip-form protruding parts 21 of the bending roll 20 are set at an acute angle, the ePTFE tape 110 can be bent to an acute angle even if a guide member 70 is not used.

As is shown in the abovementioned FIG. 6, it is desirable that the ePTFE tape 110 in which the bent parts are set at an acute angle by means of a guide member 70, strip-form protruding parts 21 that have acute-angle corners or the like be inverted (i.e., turned to the opposite side from the bending direction) by being fed to a folding roll 30. The reason for this is that this makes it possible to make the folded width D more uniform.

Figure 18:
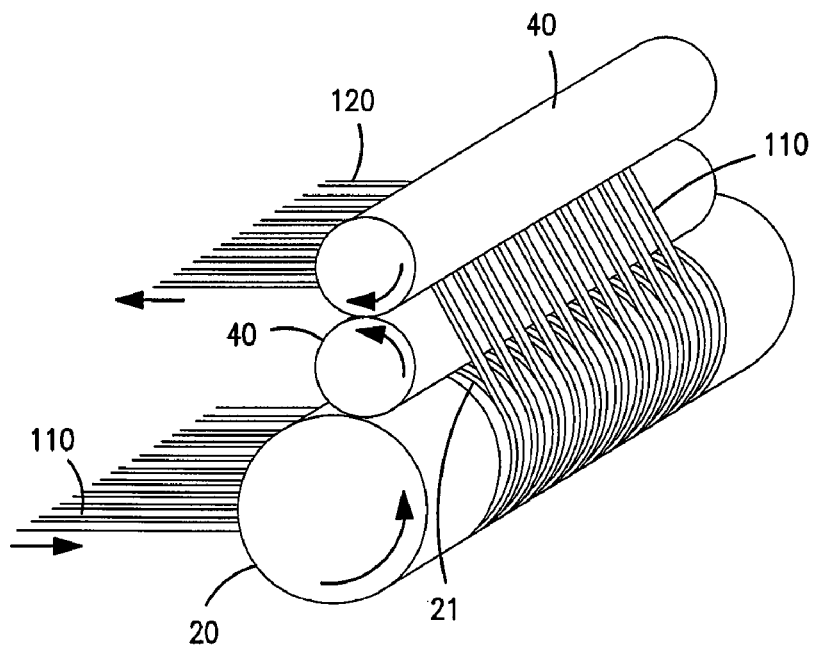
FIG. 18 is a schematic perspective view used to illustrate still another alteration of the manufacturing method of the present invention.

However, an inversion treatment by the folding roll 30 is not essential. For instance, in the example shown in FIG. 18, the ePTFE tape is bent to an acute angle by means of strip-form protruding parts 21 having acute-angle corners, and this ePTFE tape is then directly pressed by a pair of nip rolls 40, 40 without being inverted. The folded width can also be made substantially uniform by this method. Furthermore, in the example shown in FIG. 17, the bent parts can be made substantially uniform by utilizing the abovementioned guide member 70 together with strip-form protruding parts 21 having acute-angle corners, or instead of strip-form protruding parts 21 having acute-angle corners.

A preferable method is a method in which both an acute angle treatment and an inversion treatment of the bent parts are performed. If these methods are combined, the folded width D can be more reliably made substantially uniform.

In the method of the present invention, the pressing of the bent ePTFE tape 120 (pressing or another action as performed by rolls 40 or the like) is likewise not essential; however, such pressing is desirable since this is extremely useful in heightening the uniformity of the folded width D by strongly applying a folded habit. Any of various methods may be used for this pressing, as long as a pressing force can be caused to act in the direction of thickness of the tape. For example, the ePTFE tape 120 can be caused to pass through slits in which the gap in the thickness direction gradually becomes narrower.

For example, the running speed of the ePTFE tape in the bending roll 20, guide member 70, folding roll 30, nip rolls 40 and the like is 1 m/minute or greater (especially 5 m/minute or greater) but 20 m/minute or less (especially 15 m/minute or less).

It is desirable that the drawing of the folded ePTFE tape 120 be performed under heating. For example, it is recommended that this drawing be performed at a temperature that is equal to or greater than the melting point of PTFE (e.g., approximately 330 to 370° C.). As a result of this drawing being performed under heating, the folded parts 143 and 144 can be heat-set (especially thermally fused), so that the shape can be set. Furthermore, the draw ratio, for example, is approximately 5 times or greater (especially 7 times or greater), but 20 times or less (especially 15 times or less).

Conventional universally known products can be used as the ePTFE sheet that is provided to the abovementioned manufacturing method. For example, the ePTFE sheet may be a sheet obtained by the method described in Japanese Patent Publication No. 51-18991.

Like a conventional PTFE yarn, the slit yarn of the present invention can be used in a broad range of fields; however, the slit yarn of the present invention is especially superior to a conventional PTFE yarn when used in a twisted yarn. Specifically, in the slit yarn of the present invention, the folded width D is substantially uniform in the direction of length of the yarn. Accordingly, when a twist is applied so that the yarn is formed into a twisted yarn, twisting irregularities can be reduced. In particular, in conventional PTFE slit yarns, twisting irregularities are conspicuous when the number of twists is 800 T/m or less (e.g., 700 T/m or less, and especially 600 T/m or less); however, in the slit yarn of the present invention, twisting irregularities can be reduced even in the case of such a low twist number.

Furthermore, in twisted yarns obtained from the slit yarn of the present invention, the folded width D is substantially uniform, and twisting irregularities are reduced; accordingly, the yarn diameter is made highly uniform. Consequently, when cloths are formed from these twisted yarns, these cloths can be utilized in an extremely advantageous manner as supports for various types of membranes (reverse osmosis membranes, ultra-filtration membranes, precision filtration membranes, bag filter filtration membranes, ion exchange membranes and the like; and especially ion exchange membranes).

For example, the performance (ion exchange capacity) of an ion exchange membrane is affected by the yarn diameter of the cloth constituting the support. Specifically, the ion exchange capacity can be increased by reducing the yarn diameter so that the blocking effect of the yarn is reduced. If the yarn diameter is made uniform using the slit yarn of the present invention, the thick-diameter part can be reduced; accordingly, this is extremely advantageous in increasing the ion exchange capacity.

Furthermore, in a conventional method, in order to make the yarn more slender while maintaining the uniformity of the yarn diameter, it is necessary to form narrow slits in a relatively thick ePTFE sheet, so that an ePTFE tape 110 is formed. The slit cross section is increased, and there is a danger that nap will be generated. In the slit yarn of the present invention, both side parts of the slit ePTFE tape 110 are folded at a uniform width; accordingly, a PTFE yarn with a uniform yarn diameter can be obtained even from a thin ePTFE sheet. Consequently, the slit sectional area can be reduced, and the generation of nap can also be reduced to a large degree. Accordingly, an ion exchange membrane which is superior in terms of ion exchange capacity, and in which the generation of nap can also be reduced, can be obtained.

The cloth of the present invention uses a twisted yarn obtained from the slit yarn of the present invention, and is worked and manufactured into desired shapes in accordance with the applications involved such as woven fabrics, knits, nonwoven fabrics, felts, nets and the like.

For example, in cases where an ion exchange membrane is manufactured, the abovementioned cloth can be appropriately used; however, from the standpoints of mechanical strength and dimensional stability, a woven fabric is preferably used. There are no particular restrictions on the structure of the woven fabric used; a plain weave, satin weave, twill or the like can be appropriately used. A plain weave is desirable in terms of obtaining dimensional stability, and in terms of obtaining superior uniformity when an ion exchange membrane is manufactured. The slit yarn used in an ion exchange membrane ordinarily has a denier of 10 to 400 denier and a twist frequency of 150 to 4000 times. The weave density in cases where a plain weave is used is appropriately set in accordance with the required performance; however, both warp and woof are 5 yarns per inch or greater, preferably 10 yarns per inch or greater, and 100 yarns per inch or less, preferably 70 yarns per inch or less. If the weave density falls below 5 yarns per inch, the uniformity of the ion exchange membrane is lost, and the strength becomes insufficient. If the weave density exceeds 100 yarns per inch, the ion blocking rate of the slit yarn becomes high, so that there is a danger that the performance of the ion exchange membrane will drop.

The ion exchange membrane of the present invention is manufactured by forming a composite of an ion exchange resin and the cloth of the present invention. The type of ion exchange resin used and the method used to form a composite of the cloth and ion exchange resin can be appropriately selected in accordance with the application involved, e.g., sodium chloride electrolysis, fuel cell use or the like; here, a method that is especially suitable for use in a fuel cell application will be described.

Ion exchange resins can be classified as non-fluororesin type ion exchange resins and fluororesin type ion exchange resins. Examples of non-fluororesin type ion exchange resins include polyalkylene oxides, polyvinyl alcohols, sulfonated polyether ether ketones, styrene—divinylbenzene ion exchange resins and the like. These may also form metal salts. Desirable non-fluororesin type ion exchange resins include polyalkylene oxide—alkali metal salt composites (e.g., ethylene oxide oligomers polymerized in the presence of alkali metal salts such as lithium chlorate or the like), polyether ether ketone sulfonated by being placed in fuming sulfuric acid, and the like. Examples of fluororesins type ion exchange resins include perfluorosulfonic acid resins, perfluorocarboxylic acid resins and the like. Especially desirable fluororesin type ion exchange resins are perfluorosulfonic acid resins. Furthermore, perfluorosulfonic acid resins are commercially marketed as "Nafion" of DuPont Co., "Aoiplex" of Asahi Kasei K.K., and "Flemion" of Asahi Glass K.K. These commercially marketed products may also be used.

In order to form a composite from the cloth of the present invention and an ion exchange resin, the ion exchange resin is dissolved in a solvent to prepare an ion exchange resin solution. The type and concentration of the solvent are appropriately determined in accordance with the type of the ion exchange membrane, the structure and density of the cloth and the like. Next, the cloth of the present invention is impregnated with the abovementioned ion exchange resin solution, and an ion exchange membrane is obtained by evaporating the solvent in an oven.

Furthermore, an ion exchange membrane can also be manufactured by extruding a perfluororesin having —$SO_2F$ functional groups into film form on at least one side of a cloth by means of hot melt extrusion molding using a T die, laminating and integrating the cloth and resin film, and then performing hydrolysis so that the —$SO_2F$ functional groups are converted into —$SO_3H$ groups or metal salts such as —$SO_3Na$ or the like. In this case, an ion exchange resin with other functional groups may also be used.

Furthermore, the cloth of the present invention may be subjected to a smoothing treatment such as compression between rolls or the like (calendar treatment or the like) in order to make the thickness of the ion exchange membrane uniform.

EXAMPLES

Below, the present invention will be described more concretely in terms of examples. However, the present invention is not limited by these examples; the invention can of course be worked with appropriate alterations being added in accordance with the main points described above and below. All of these alterations are included in the technical scope of the invention.

A drawn porosified PTFE sheet was manufactured according to the method described in Japanese Patent Publication No. 51-18991. Specifically, kerosene was mixed with a PTFE powder, and this mixture was formed into a tape by extrusion and rolling. Next, the kerosene was removed by heating and drying at a temperature of 200° C., and the tape was uniaxially drawn to a draw ratio of 300% at a temperature of 300° C., thus producing a PTFE sheet (thickness 60 μm) having an expanded porous structure.

Figure 20:
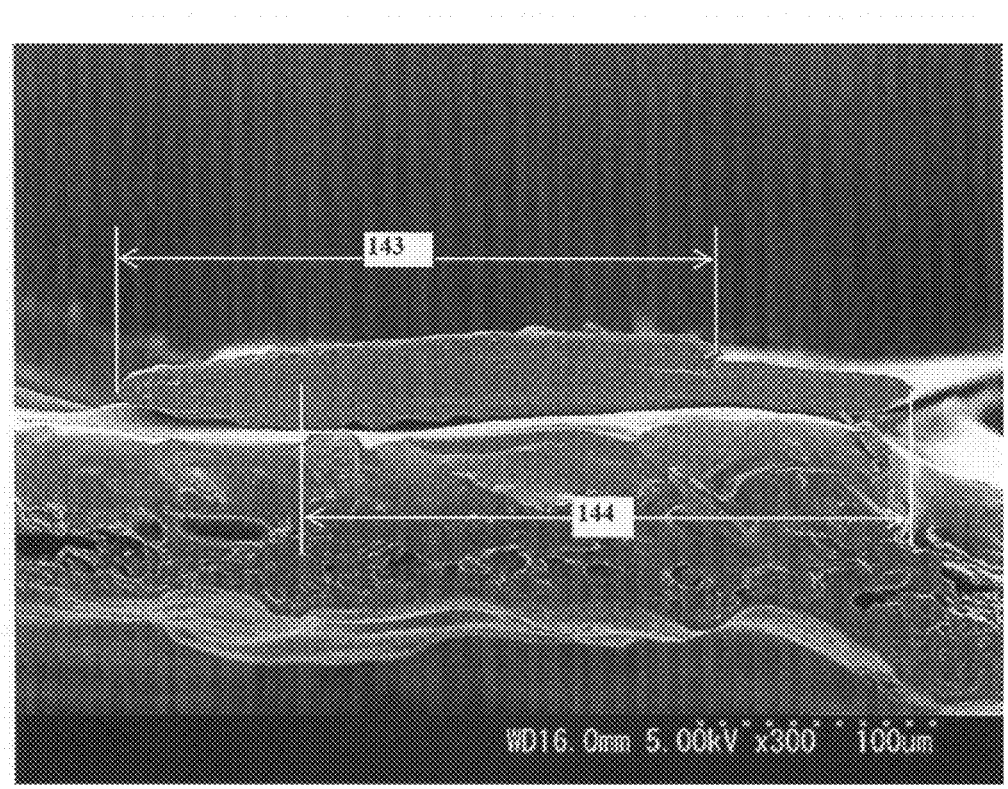
FIG. 20 is an electron micrograph of the sectional surface of the slit yarn obtained in Embodiment 1.
Figure 21:
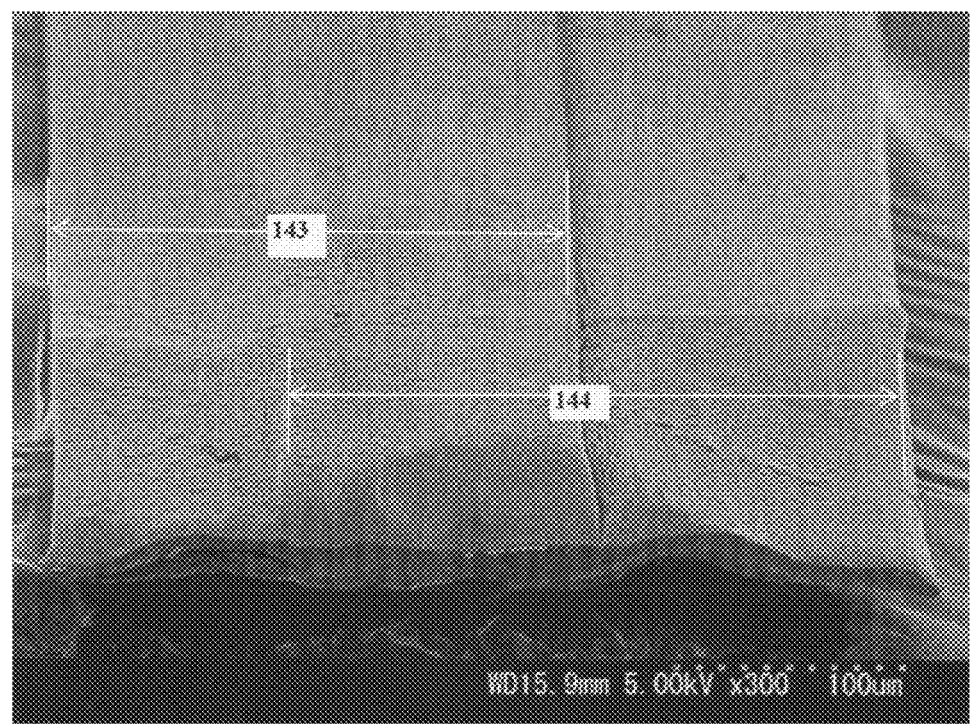
FIG. 21 is an electron micrograph showing a plan view of the slit yarn obtained in Embodiment 1.

An expanded porous PTFE (ePTFE) tape obtained by slitting this ePTFE sheet to a width of 4.0 mm by means of a cutting blade was treated as shown in FIGS. 1 through 7, thus producing a slit yarn. Furthermore, the width of the strip-form protruding part 21 was set at 1.0 mm, and the running speed of the ePTFE tape 110 and folded tape 120 was set at 10 m/min. The drawing conditions of the folded tape 120 were as follows: drawing temperature 350° C., draw ratio 1000%. As is clear from a sectional photograph (FIG. 20) and plan view photograph (FIG. 21) of the slit yarn, this slit yarn has a shape in which the folded parts 143 and 144 shown in FIG. 9 are superimposed.

The characteristics of the slit yarn thus obtained were as follows:

Denier
100 d (denier)
Yarn Width
Average value W(avg) of yarn width: 320 μm
Standard deviation W(σ) of width W: 6.7 μm
Fluctuation coefficient X: 2.1%

This yarn width W was measured at 20 consecutive points at intervals of 0.5 m. The projection measuring device "PROFILE PROJECTOR V-12" manufactured by Nikon K.K., and "DIGITAL COUNTER CM-6S" manufactured by Nikon K.K., were used for this width measurement.

Twist Characteristics (Twisting Irregularity)

The slit yarn was S-twisted (right twisted) at 500 t/m. When the portions of the twisted yarn obtained with no twists applied were visually counted, a count of 0 locations per 20 m was obtained.

Wear Resistance

Figure 19:
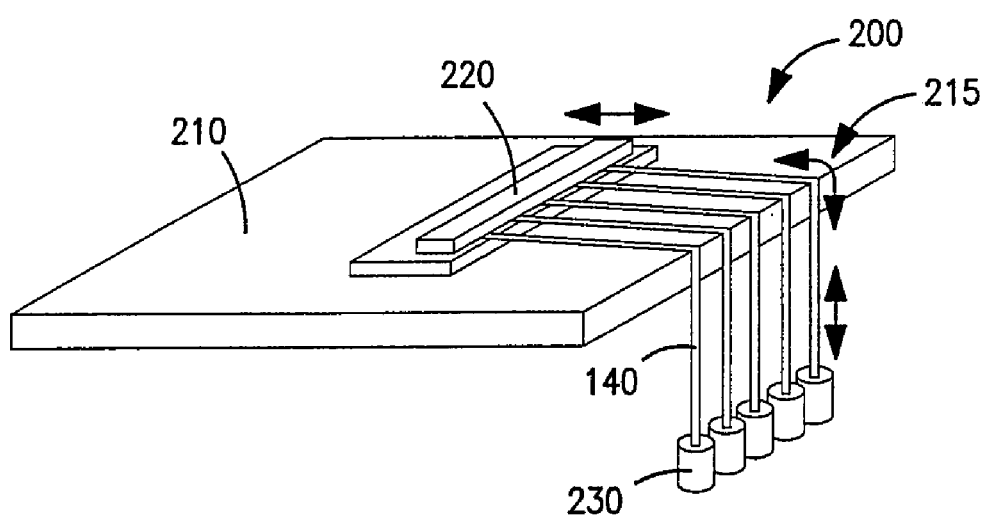
FIG. 19 is a schematic perspective view used to illustrate the method of the present invention for measuring wear resistance.

The wear resistance of the slit yarn was evaluated using the test machine 200 shown in FIG. 19. In this test machine 200, a fastening fitting 220 capable of a reciprocating motion was attached to the upper surface of a steel plate 210. The edge parts 215 of the steel plate 210 were chamfered to a curvature radius of 0.5 mm. One end of the slit yarn 140 was held by the abovementioned fastening fitting, and a weight 230 was attached to the other end. This weight 230 was suspended downward from the side of the steel plate 210. In this case, the slit yarn 140 was disposed so that the folded surface of the slit yarn was on the upper side (opposite side from the steel plate). Furthermore, the mass of the weight was set at 0.1 g per denier of the slit yarn (i.e., 10 g in the case of a 100 d slit yarn). The fastening fitting 220 was caused to perform a reciprocating motion at a speed of 33 mm/second and a reciprocating width of 50 mm, and a test was performed as to whether or not nap was generated in the slit yarn 140 by the edge parts 215 of the steel plate 210. The presence or absence of the generation of nap was checked for 15 samples of the slit yarn 140, and the proportion of the slit yarn showing the generation of nap was determined. Furthermore, the abovementioned test was performed for 100 reciprocating passes.

The proportion of nap generated in the slit yarn of Example 1 was 10%.

Comparative Example 1

Except for the fact that the ePTFE tape was directly drawn without being folded, the procedure was the same as in Example 1.

When the characteristics of the slit yarn obtained were investigated in the same manner as in Example 1, the following values were obtained.

Denier: 100 d
Average value W(avg) of the yarn: 800 μm
Standard deviation W(σ) of the width (W): 72 μm
Fluctuation coefficient X: 9.0%
Twist characteristics (twisting irregularity): 9 locations per 20 m
Wear resistance (proportion of nap generated): 70%

As is clear from a comparison of Example 1 and Comparative Example 1, the slit yarn of Example 1 shows a substantially uniform folded width; accordingly, the variation in yarn diameter is suppressed, and the generation of nap is also reduced. Furthermore, the twisting irregularity is also reduced.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method for manufacturing a slit yarn, comprising (a) providing an expanded porous polytetrafluoroethylene sheet, (b) slitting said sheet in the direction of length to form a tape having a tape width and side parts, (c) running said tape over a first rotating roll on which a strip-form protruding part having a top surface with a width narrower than said tape width is formed so as to cover said top surface with said tape, (d) bending said tape at both side parts, (e) folding said side parts, and (f) drawing said tape.

2. The method for manufacturing a slit yarn according to claim 1, wherein a tensile tension is applied to the tape when the tape is caused to run along said strip-form protruding part.

3. The slit yarn manufacturing method according to claim 1, wherein a curvature radius R of corner parts formed by said top surface of said strip-form protruding part is 1.0 mm or less.

4. The slit yarn manufacturing method according to claim 1, wherein both side parts of the tape are bent to an acute angle by setting the angle formed by the top surface and a side surface of said strip-form protruding part at less than 90°.

5. The slit yarn manufacturing method according to claim 1, wherein only the bent part of the tape is caused to advance in an interval that becomes narrower moving in a direction of progression of the tape following the bending of said tape, and said bent part is formed to an acute angle.

6. The slit yarn manufacturing method according to claim 4, wherein both side parts of the tape are bent into acute angles, and the tape is then caused to run along a second rotating roll while the system is arranged so that the bending side forms the surface, and both side parts of the tape are folded.

7. The slit yarn manufacturing method according to claim 4, wherein both side parts of the tape are bent into acute angles, and the tape is then pressed in the direction of thickness so that both side parts of the tape are folded.

* * * * *